United States Patent
Singh et al.

(10) Patent No.: US 8,055,709 B2
(45) Date of Patent: Nov. 8, 2011

(54) SYSTEMS AND METHODS FOR CLICKSTREAM ANALYSIS TO MODIFY AN OFF-LINE BUSINESS PROCESS INVOLVING PRODUCT PRICING

(75) Inventors: Man Jit Singh, Los Angeles, CA (US); David Cancel, Newburyport, MA (US)

(73) Assignee: Compete, Inc., Boston, MA (US)

( * ) Notice: Subject to any disclaimer, the term of this patent is extended or adjusted under 35 U.S.C. 154(b) by 172 days.

(21) Appl. No.: 11/923,620

(22) Filed: Oct. 24, 2007

(65) Prior Publication Data
US 2008/0183868 A1  Jul. 31, 2008

Related U.S. Application Data

(63) Continuation of application No. 10/267,978, filed on Oct. 9, 2002.

(60) Provisional application No. 60/362,937, filed on Mar. 7, 2002, provisional application No. 60/363,001, filed on Mar. 7, 2002.

(51) Int. Cl.
*G06F 15/16* (2006.01)

(52) U.S. Cl. ......... 709/204; 709/203; 709/205; 709/217

(58) Field of Classification Search ............. 715/400; 709/201, 204, 217, 224
See application file for complete search history.

(56) References Cited

U.S. PATENT DOCUMENTS

| | | | |
|---|---|---|---|
| 6,055,570 A * | 4/2000 | Nielsen | 709/224 |
| 6,334,110 B1 | 12/2001 | Walter et al. | |
| 6,904,408 B1 * | 6/2005 | McCarthy et al. | 705/2 |
| 6,934,748 B1 | 8/2005 | Louviere et al. | |
| 6,981,040 B1 | 12/2005 | Konig et al. | |
| 7,035,855 B1 | 4/2006 | Kilger et al. | |
| 7,373,313 B1 * | 5/2008 | Kahle et al. | 705/26.3 |
| 7,395,259 B2 * | 7/2008 | Bailey et al. | 707/999.1 |
| 7,437,364 B1 * | 10/2008 | Fredricksen et al. | 709/201 |
| 7,558,822 B2 * | 7/2009 | Fredricksen et al. | 709/217 |
| 7,565,425 B2 * | 7/2009 | Van Vleet et al. | 709/217 |
| 2001/0014868 A1 * | 8/2001 | Herz et al. | 705/14 |
| 2001/0051932 A1 * | 12/2001 | Srinivasan et al. | 705/400 |
| 2002/0004868 A1 * | 1/2002 | Hagiwara | 709/210 |
| 2002/0053078 A1 | 5/2002 | Holtz et al. | |
| 2002/0065912 A1 * | 5/2002 | Catchpole et al. | 709/224 |
| 2002/0099824 A1 | 7/2002 | Bender et al. | |
| 2002/0100042 A1 | 7/2002 | Khoo et al. | |
| 2002/0116348 A1 * | 8/2002 | Phillips et al. | 705/400 |
| 2002/0123926 A1 | 9/2002 | Bushold et al. | |
| 2002/0143984 A1 * | 10/2002 | Hudson Michel | 709/238 |
| 2002/0198882 A1 * | 12/2002 | Linden et al. | 707/10 |
| 2003/0018677 A1 | 1/2003 | Mathur et al. | |
| 2003/0126095 A1 | 7/2003 | Allen | |
| 2003/0126250 A1 | 7/2003 | Jhanji | |
| 2003/0128818 A1 | 7/2003 | Kerr et al. | |
| 2003/0171977 A1 * | 9/2003 | Singh et al. | 709/224 |
| 2004/0172389 A1 * | 9/2004 | Galai et al. | 707/3 |
| 2004/0177015 A1 * | 9/2004 | Galai et al. | 705/35 |
| 2005/0004889 A1 * | 1/2005 | Bailey et al. | 707/1 |
| 2005/0222906 A1 | 10/2005 | Chen | |
| 2006/0004717 A1 * | 1/2006 | Ramarathnam et al. | 707/3 |

* cited by examiner

*Primary Examiner* — Ian N Moore
*Assistant Examiner* — Jenee Alexander
(74) *Attorney, Agent, or Firm* — Strategic Patents, P.C.

(57) ABSTRACT

Methods and systems are provided herein for the analysis of clickstream data of online users. The analysis methods and systems allow for the creation of new offline business methods based on online consumer behavior. In embodiments, the output file enables the third party to track and analyze competitive product pricing.

16 Claims, 14 Drawing Sheets

SYSTEMS AND METHODS FOR CLICKSTREAM ANALYSIS TO MODIFY AN OFF-LINE BUSINESS PROCESS INVOLVING PRODUCT PRICING

CROSS-REFERENCE TO RELATED APPLICATIONS

This application is based on, claims priority to, and incorporates by reference the following U.S. Provisional Patent Applications: an application filed Mar. 7, 2002 entitled Business Method for URL Analysis, naming Man Jit Singh as inventor, and an application filed Mar. 7, 2002 entitled Technology Platform for URL Analysis.

BACKGROUND

The advent of the Internet and the Worldwide Web has produced a host of electronic commerce applications, in which users interact with content and engage in a wide variety of transactions, ranging from ordering books, CDs and other items, to participating in auctions, to downloading music, to a host of other activities. Methods and systems are widely used for tracking the behavior of online users, both individually and as groups. The output from those methods and systems are typically used to adjust the structure and content of online offerings to help attract more users, or to get current users to engage in more interaction and more transactions with the provider.

Methods and systems for analyzing online user behavior range from statistical techniques, such as collaborative filtering, to use of neural nets and similar facilities. While such methods have had some success, the promise of electronic commerce remains somewhat unfulfilled. Many online businesses have failed, and those remaining find the environment increasingly competitive. Meanwhile, many businesses find that online offerings (including their own), merely take business away from offline product offerings, or that the online offerings harm offline offerings in other ways, such as by forcing price reductions. Thus, methods and systems are needed for providing improved coordination between online and offline offerings. In addition, methods and systems are needed for allowing offline businesses to take advantage of information that can be discerned from online customer behavior.

SUMMARY

Methods and systems are provided herein for the analysis of behavior of online users. The analysis methods and systems allow for the creation of new offline business methods based on online consumer behavior.

Methods and systems are also provided for providing a host computer for handling a plurality of processes, the host system having a collection facility, a network, a pre-calculation facility, a calculation facility, and a post-calculation facility; obtaining an input data set of online user data from a plurality of data providers, wherein the input data set represents HTTP transactions of a plurality of online users; and sending an output data set to a co-location facility to permit remote access by a party other than the host.

The calculation facility may comprise providing a cluster of machines distributed in a parallel processing configuration. Output data may be stored in a data warehouse or sent to a collocation facility.

Methods and systems are also provided for obtaining an input data set from a plurality of data providers, the data set comprising data representing HTTP transactions for a plurality of users; performing a pre-calculation process to produce a file in a file format suitable for performing calculations; performing calculations on the formatted file; and performing post-calculation on the results of the calculations to produce an output file.

Methods and systems are further provided for transferring the output file to at least one of a co-location facility and a data warehouse.

Methods and systems are also provided for collecting the data set for analysis by a host computer; delivering the data set to an internal network; and performing an integrity check on the data.

Methods and systems are also provided wherein the formatted file comprises data selected from the group consisting of a file identifier, a user identifier for a user who completed an HTTP transaction, a data provider identifier for the data provider who provided the data representing the HTTP transaction, a timestamp for the HTTP transaction, a URL for the HTTP transaction, and a protocol identifier for the protocol of the transaction.

The pre-calculation step may include reading a list of URL rules; for each character of the URL of a formatted file, walking the character of the URL through the URL rules; for each rule in the URL rules, applying the rule to the URL of the formatted file; and outputting a modified URL, the modified URL reflecting the application of the rules to the original URL. The modified URL may be appended to a modified formatted file.

The methods and systems may further comprise providing a panel selection process for selecting a panel of users, data for which will be used in an input data set. The process may include conducting a survey of user demographics for an initial user panel; determining a statistic related to the demographics of the users in the user panel; comparing the statistics to the statistics for a past user panel; selecting a new panel of users representing a desired set of demographic characteristics; and determining whether to keep or discard a data item based on membership of a user in the panel.

The URL of the output file may include a session identifier, a domain identifier, a subdomain identifier, a path and a query string.

The output file may further include a hash, such as hash of the domain identifier, the subdomain identifier, or the path.

The methods and systems described herein may include calculating a metric based on the data in the output file. The metric may be a vertical market metric calculation, a search term metric calculation, or other metric.

The metric calculation may be a vertical market metric calculation that can include using a page extractor module for extracting data identifying a page of online content; using a fetcher module to retrieve the page content from a computer network; and using a classifier module to classify the page in at least one content category selected from a group of possible content categories.

Metrics may be calculated using a cluster of machines configured in a parallel-processing configuration or batch-processing configuration.

In embodiments, an input URL is decomposed based on semantic meaning of the pages viewed by the user who executes the HTTP transaction. The decomposition process may be made in the presence of redirection from a primary URL to a secondary URL or in the presence of a proxy URL for a second URL.

Methods and systems may also include obtaining an input data set reflecting clickstream activity of a plurality of online users; analyzing user behavior reflected by the clickstream activity; drawing an inference based on the user behavior; and modifying an offline process based on the inference.

The inference may relate to cross-shopping behavior between different goods and the offline process may be a marketing promotion. The input data may relate to price sensitivity of a shopper and the offline process may be a pricing process for an offline item. The input data may relate to ordering of a user's views of items and the offline process may relate to merchandizing and to product placement to promote viewing goods in a particular order. The input date may relate to user buying interest or share of interest and the offline process may relate to forecasting offline demand for a product. The input data may relate to actions of users with respect to online content choices and the offline process may relate to presenting offline media content.

In embodiments the methods and systems may include obtaining a set of data reflecting online actions of a plurality of users; analyzing the data to identify characteristics of the user's behavior; and modifying an off-line business process based on the identified characteristics.

DETAILED DESCRIPTION

Figure 1:
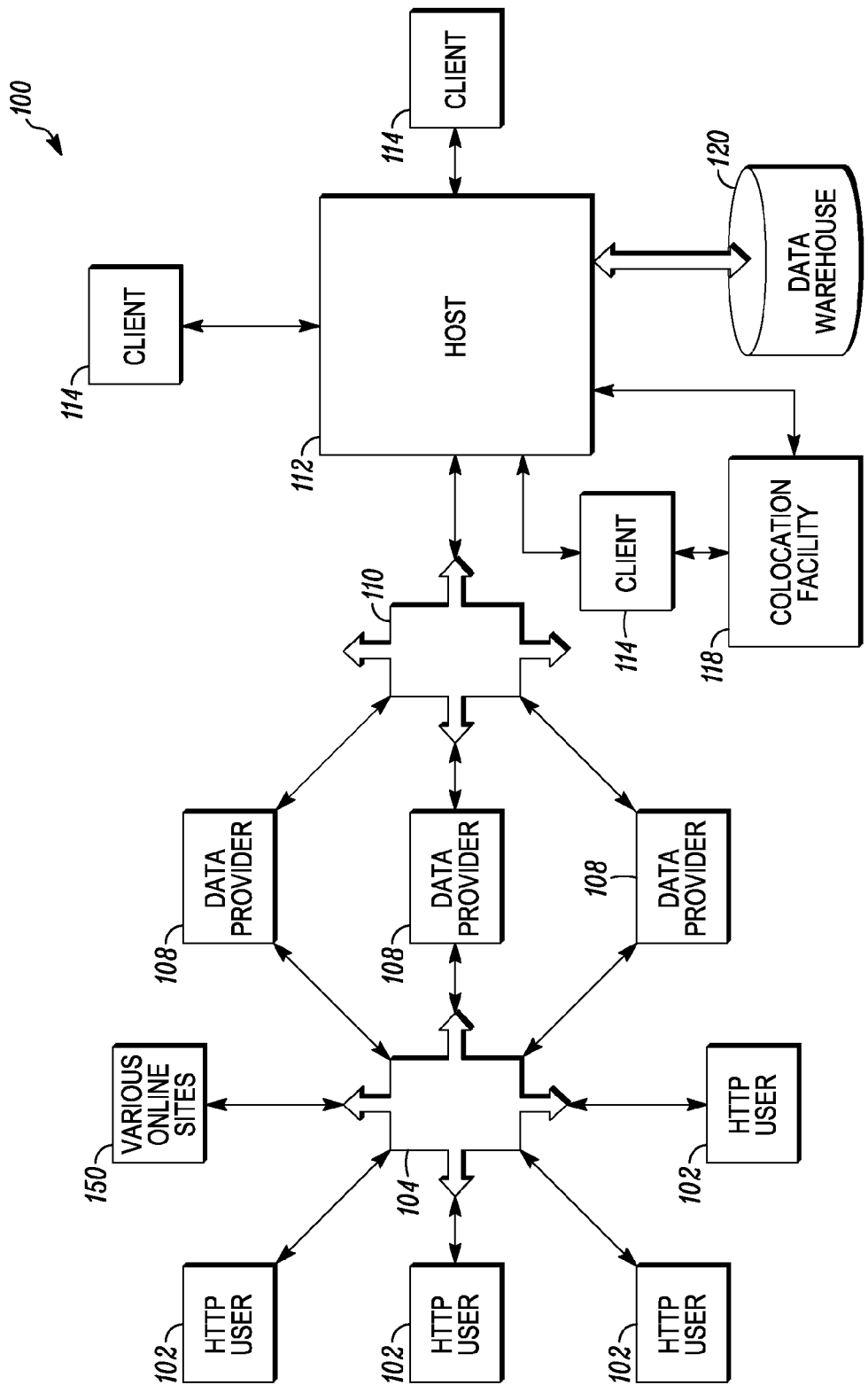
FIG. 1 is a schematic diagram showing high-level entities that interact in the methods and systems disclosed herein.

Referring to FIG. 1, a schematic diagram 100 shows high-level entities that participate in various embodiments of methods and systems disclosed herein. The methods and systems are facilitated by a host 112, which may have a host computer system for facilitating various processes and functions described below. The host may have a plurality of clients 114 who interact with the host to obtain information, analysis, or a variety of services. In some cases the clients 114 obtain information from the host 112 through a separate facility, such as a co-location facility 118. The host 112 operates on data that it receives through a plurality of data providers 108. The data from the data providers 110 is typically sent to the host over a computer network 110, such as the Internet, or through any other conventional communications facility. The host 112 may store data in a data facility 120, such as a data warehouse. The data providers 108 may each have one or more data centers, which may consist of conventional facilities for storing data relating to use of online services. The data providers 108 may thus run a plurality of servers, which may be configured as server farms. The data providers 108 may be Internet Service providers, ecommerce companies, content providers, media companies, or other companies that collect data regarding user interactions online. The data providers typically obtain their data from the interaction of various users 102 who trigger HTTP transactions as they engage in online behavior with various online sites 150. The users 102 interact with their computers, webTVs, PDAs or other communications-enabled devices, through a communication facility 104, which may represent the Internet, Worldwide Web, or other wired or wireless computer network. Those interactions are tracked and stored by the data provider 108, and some of them are passed along to the host 112 for analysis on behalf of various clients 114.

Referring still to FIG. 1, the online behavior of a user 102 is typically reflected in a series of HTTP (HyperText Transfer Protocol) transactions, HTTPS transactions. These transactions can represent HTML pages or any of a wide variety of other content. The transactions are typically made from a user's browser (such as an Internet Explorer or Netscape Navigator browser), but HTTP transactions can be made from other applications as well. The browser or other application can reside on any computer, such as a laptop, personal computer, server, personal digital assistant, WebTV, or other device.

The user 102 connects to online content sources by a computer network 104, such as the Internet. The online content sources typically comprise one or more servers, which may be HTTP servers. In HTTP transactions, the servers serve content over the network in response to messages from the user's computer.

In their online behavior, users can interact with sites of one or more vendors through the data provider 108. Those data providers 108 typically track users' interactions with their sites through logs or similar facilities. The logs record user behavior, tracking what pages of content they have viewed in what sequence and for what amounts of time. Thus, either at the desktop or at the server farm, information is being tracked about every HTTP transaction that the individual executes at any time. When information is tracked at a server farm it is usually subject to an agreement between the user and a host (such as an ISP or other site host). The agreement typically sets out the conditions under which the host can share data with third parties, including demographic data about the user and data about the user's actions. A facility is then put in place at the data provider 108 to follow rules that allow capturing of users' transactions and sending some individuals data while not doing so for others.

Data about user actions can be logged in real time or collected and sent in batches by the various data providers 108. The individuals 102 visiting the various online sites 150 in turn serve as data sources to data providers 108 and/or for a host 112 of the methods and systems described herein.

Data is conveyed from the data providers 108 to the host 112 periodically. In some cases it is pushed from the data provider 108 to the host 112, while in others it is pulled by the host 112 from the data provider 108. The transfer is typically over a network 110, such as the Internet. The information that gets pulled or pushed across is typically HTTP/HTTPS information for each of the users 102 of that data provider 108, along with demographic information for each of those users 102.

Figure 2:
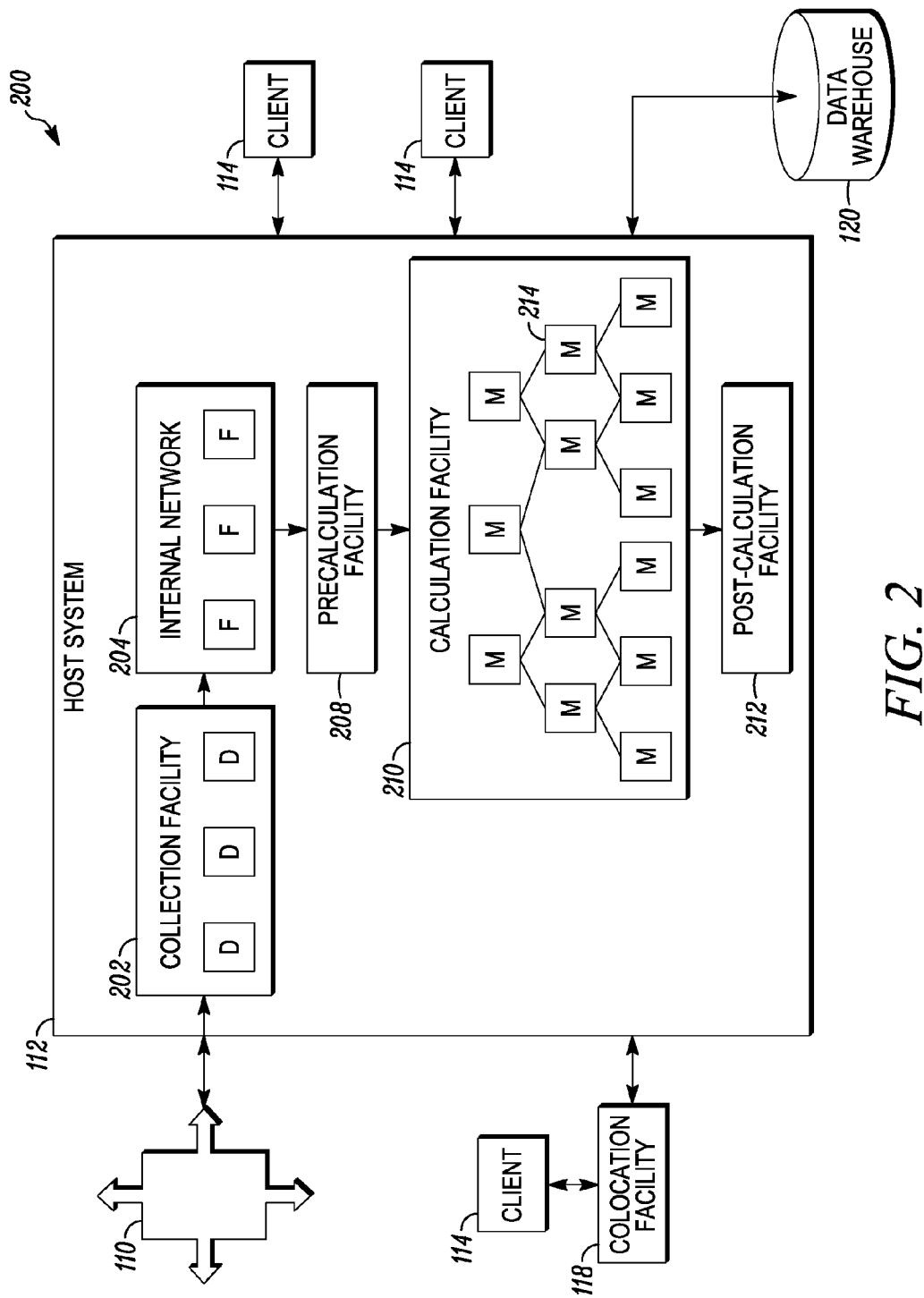
FIG. 2 is a schematic diagram showing further details of a host system of the methods and systems disclosed herein.

Referring to FIG. 2, a schematic diagram shows certain components of a host system 200. Through a series of processes and modules, the host system 200 takes data from data providers 108 and converts it into information suitable for a client 114. Inside the host system 200 a collection facility 202 collects the data from the various data providers 108. The collection facility 202 can comprise a set of machines that look at rules that are generated by the host 112 for the data provider 108 in question. Thus, the host system 200 expects data of a given format from a given data provider 108. The host system 200 can have a timing facility that generates alerts if the data from a given data provider 108 doesn't arrive on time.

Once the data has come across the network from the data provider 108, the host system 200 looks at individual files. Each data provider 108 follows a convention for the files they send over, which may contain demographic information, clickstream data, and a file signature for all files the data providers send over. To ensure that all of the data was properly transmitted, it is desirable to use a facility such as an MD5 hash of the file. If the size of the file does not match, then the host 112 can determine that the file was not properly transferred.

In embodiments, the host system 200 can comprise a plurality of Free BSD X86 Intel machines, running software written in an object-oriented language such as C++. Referring still to FIG. 2, the host system 200 may also include an internal network 204 that can handle files that come from the collection facility 202. The host system 200 may also include a pre-calculation facility, which may consist of software modules for handling certain operations that are necessary to generate a suitable form of file for handling by the host system 200. The host system 200 may also include a calculation facility 210, which may consist of software modules and a cluster 214 of machines for running a large number of parallel calculations on the files that are obtained from the pre-calculation facility 208. The calculations generate various information, such as metrics that relate to various characteristics of the behavior of users 102. The host system 200 may further include a post-calculation facility 212, which performs certain post-calculation operations on the information generated in the calculation process. Data files can be sent directly to the client 114, hosted as an ASP model, sent to a co-location facility 118, or to a data warehouse 120. Further details of the various modules, machines and facilities of the host system 200 are disclosed below.

Figure 3:
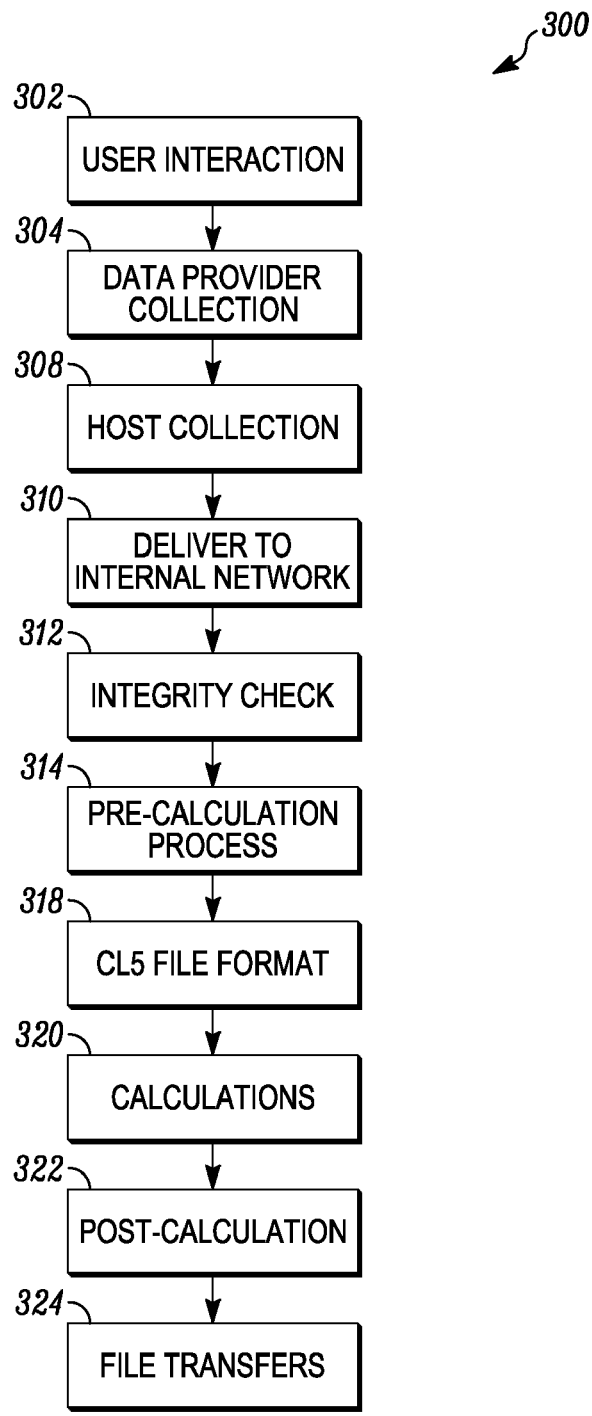
FIG. 3 is a flow diagram showing high-level process steps for an embodiment of the methods and systems disclosed herein.

Referring to FIG. 3, a flow diagram 300 depicts high-level steps for a flow of information from a user 102 through the host 112 to a client 114. First, at a step 302, the user engages in an HTTP transaction or other online interaction, such as by using a browser to interact with an e-commerce website. Next, at a step 304, a data provider 108 tracks and stores information about the actions of the user 108, such as in a log file or any of a wide range of similar facilities. The information is stored in a data center or similar facility of the data provider 108. Next, at a step 308, the host 112 collects data from the data provider 108, either by having the information pushed from the data provider 108, or by pulling the information from the data provider 108. Once the data is collected, at a step 310 the host system 200 delivers it to an internal network. Then at a step 312 the host system 200 checks the data for integrity and alerts the data provider 108 if there is a problem.

Once the integrity of the data is confirmed at the step 312, at a step 314 the pre-calculation facility of the host system 200 performs various operations needed to get data from multiple data providers into a common file format, which can be called CLF. Pre-calculation involves various sub-processes disclosed in connection with FIG. 5 and other figures below. At a step 318 the system takes the results of the pre-calculation process, a file in a standard format, and moves the files to the calculation facility 210. At a step 320 the calculation facility calculates various metrics on the files, as desired by the operator, such as for the benefit of a given client 114 or all clients 114.

After the calculation processes of the step 320 are complete, the system executes various post-calculation processes 322, typically involving merging, sorting and deduplicating results that were obtained by multiple machines into a coherent set of files. Then the system 200 transfers the files at a step 324, such as to a data facility 120, to the client 114, or to a co-location facility. Further details of these processes are disclosed below.

Figure 4:
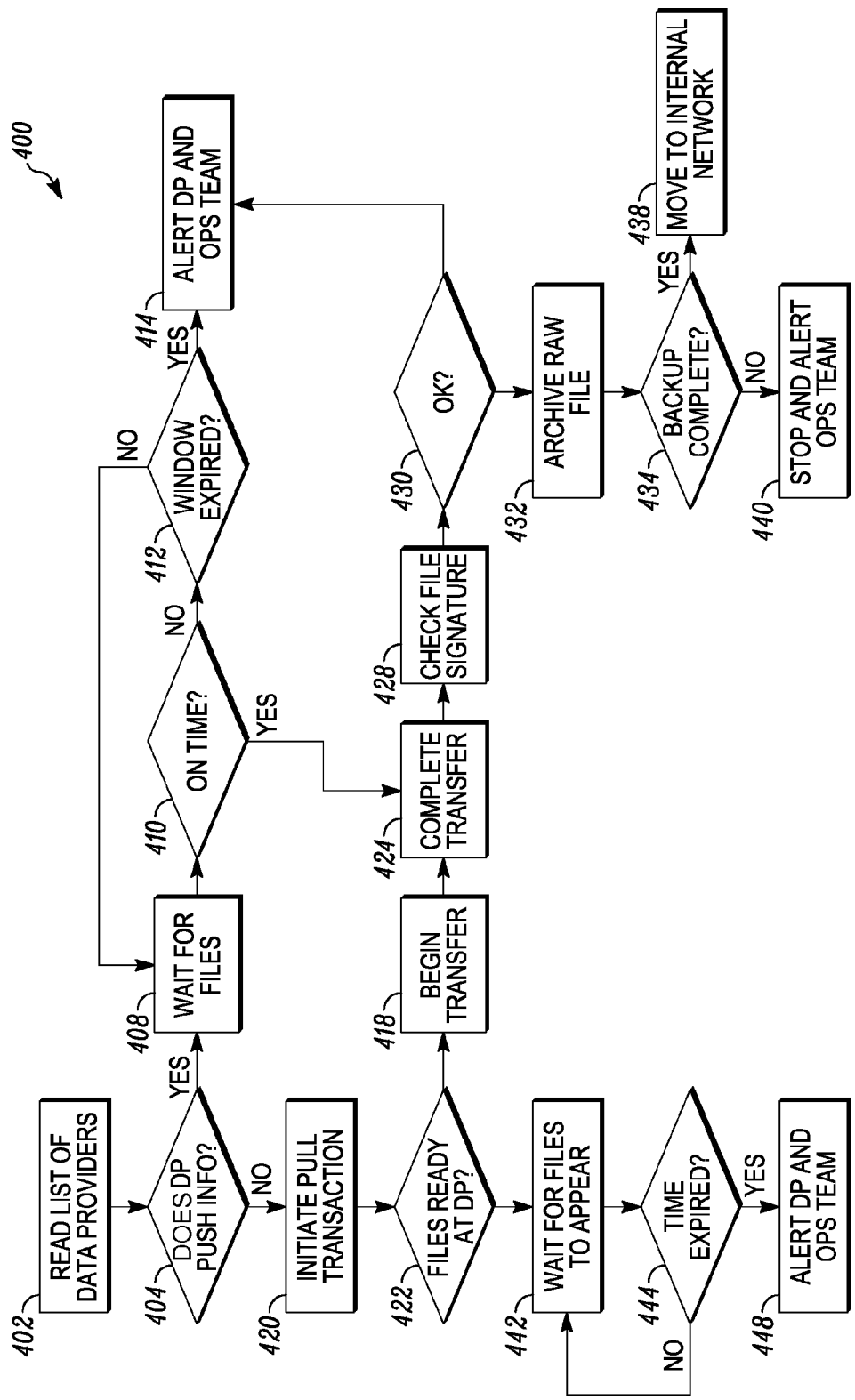
FIG. 4 is a flow diagram depicting steps of a pre-calculation process.

Referring to FIG. 4, a flow diagram 400 sets out a series of steps for an embodiment of a collection process. First, at a step 402, the system reads a list of data providers. Next, at a step 404 the system assesses for a particular data provider whether the data provider pushes information. If so, then at a step 408 the system waits for the files from the data provider. Then at a step 410 a timing facility of the system determines whether the files have arrived on time. If not, the system determines at a step 412 whether the window of time has expired for the arrival of files from that data provider. If so, then at a step 414 the system sends an alert to an operator of the host system or other individual. If at the step 412 the window has not expired, then processing returns to the step 408 to wait for the files. If at the step 410 the files are on time, then the processing is handed to step 424 the confirm completion of the transfer.

If at the step 404 it is determined that the data provider does not push information, then at a step 420 the system initiates a pull transaction with the data provider. The system then determines at a step 422 whether the files are ready at the data provider. If at the step 422 the files are ready at the data provider, then the system begins the transfer at a step 418. Processing is then sent to a step 424 until transfer is complete. Once transfer is complete (whether the data provider pushes information or the information was pulled by the host), then, at a step 428 the system checks the file signature to confirm that the files were not corrupted during transfer. If the file signature is determined at a step 430 to be okay, then at a step 432 the raw file data is archived. If the file signature is not okay at the step 430, then at the step 414 the operations team and the data provider are alerted that the file needs to be transferred again. Once the data is archived at the step 432, it is determined at a step 434 whether the archiving is complete. If archiving is complete at the step 434, then at a step 438 the files are moved for further processing, such as to an internal network of the host. If there is a problem with the archiving process, then an alert is sent to the operations team at a step 440.

If at the step 422 the files are not ready at the data provider, then at a step 442 the host system waits for a period of time and checks again. A timing facility then determines at a step 444 whether time has expired. If not, then the system continues to wait at the step 442. If so, then at a step 448 an alert is sent to the data provider and the operations team that the desired files were not ready for transfer.

In normal operation the files will transfer properly (in either a push or pull transaction), and the system will arrive at the step 438 with files ready for processing on the internal systems of the host.

Once files are ready for processing, the host system can initiate a pre-calculation process. High level steps of a pre-calculation process are depicted in a flow diagram 500 of FIG. 5. The pre-calculation process has four main high level steps. The first is a conversion process 502, which converts the files of a plurality of data providers into a common file format. Off-page connector A connects the flow diagram 500 to a flow diagram 600 of FIG. 6 that includes further details of the conversion process 502. Once the files are in a common format, the files are cleansed in a cleanse process 504. The details of an embodiment of the cleanse process are set forth in a flow diagram 800 of FIG. 8, which is connected to the flow diagram 500 by off-page connector B. Once files are cleansed, the system initiates a panel selection process 508. Details of an embodiment of a panel selection process are set forth in a flow diagram 900 of FIG. 9, which is connected to the flow diagram 500 by off-page connector C. Once the panel selection process is complete, the system initiates a transformation process. Details of an embodiment of a transformation process are set forth in a flow diagram 1000 of FIG. 10, which is connected to the flow diagram 500 by off-page connector D.

Figure 6:
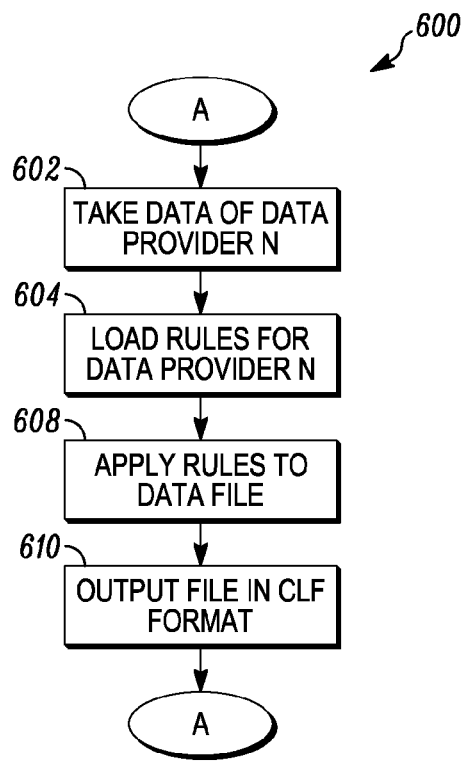
FIG. 6 is a flow diagram for a file conversion process.

Referring to FIG. 6, the files that come from multiple data providers (DPa, DPb, DPc, DPd) are input into a conversion process shown in a flow diagram 600. This is the only part of the pre-calculation process that is data-provider dependent. The conversion process of the flow diagram 600 takes information from multiple providers in different formats and is converted to a common file format for the host system. First, at a step 602, the host system takes in the data from different data providers. Next, at a step 604 the convert application (which may be embodied as an API or similar facility) loads a class that has rules specific to the data provider who provided the file in question. Next, at a step 608, the application uses the rules to read in the information from that format for each data provider. Finally, at a step 610, the system outputs the data into a standard file format for the host system. In embodiments this can be called the CLF file format.

Figure 7:
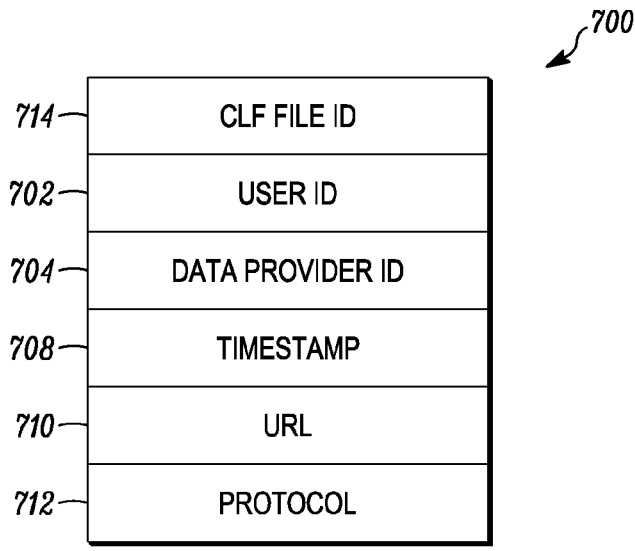
FIG. 7 is a schematic of an embodiment of a CLF file format.

FIG. 7 shows a file format 700, CLF Format, which is the standard file format for a file in an embodiment of the invention. The format 700 includes various data items, which include a file identifier 714, the identity of the user whose transactions are stored in the file, or user id 702, the identity of the data provider 704, a time stamp 708, the URL (uniform resource locator) at which the user was at the time 710, and the protocol 712 used in the transaction (e.g., HTTP, FTP, HTTPS). In embodiments the combination of the user ID 702 and the data provider ID 704 can serve as the unique file identifier 714 for the file. The file format can result in hundreds of lines for a given user's online session, with each line representing a time and URL that the user passed during the session.

Figure 8:
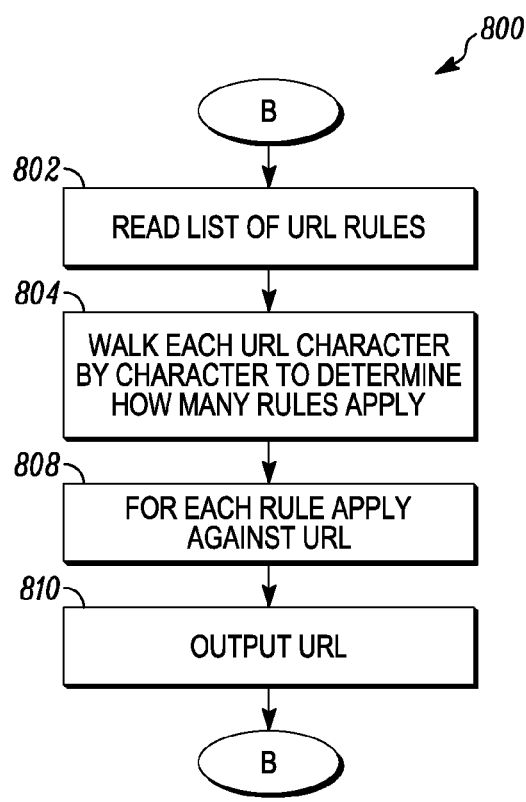
FIG. 8 is a flow diagram depicting steps for processing a URL in an embodiment of the invention.

Referring to FIG. 8, a flow diagram sets out steps for completion of a file cleansing, or cleanse, process 800. The cleanse process 800 operates on files that are in the CLF format that is generated by the conversion process 700 of FIG. 7. First, at a step 802, the system reads in a list of URL rules. Next, at a step 804, the system walks each URL character through the URL rules to determine how many rules apply to that URL. In embodiments this may occur character by character for the URL in the CLF format, using a facility such as a finite state machine. For example, if the URL were www.amazon.com, the system would look at the first character and determine how many rules apply to the character "w" located in the first position of a URL. Then the system would determine how many rules apply to the second "w" in the second position, and so on, until all characters have been examined and a complete list of applicable rules has been loaded.

Once the system has determined how many rules apply at the step 804, then, at a step 808, the system applies each applicable rules against the URL. The rules can include filters for various data providers. In embodiments the rules may relate to URLs alone, or may relate to URL/data provider combinations. In embodiments, the rules might relate to the user as well. An example of a rule is as follows. If the data provider is, for example, Amazon.com, it is known that the company modifies its URLs (in a system that is not consistent with some URL protocols) and include session identifiers in the URLs, but not in the query string where they would normally appear for some data providers. By including session identifiers in the URLs, but not in the query string, it appears that each Amazon.com URL is from a unique provider, when in fact all of them are from Amazon.com. To avoid seeing each Amazon URL as coming from a unique provider, the system can apply a rule that pulls out the session identifier from the URL and produces an output URL that doesn't have the session identifier.

Thus, at a step 810, the system outputs a cleansed URL in accordance with the various rules.

Figure 9:
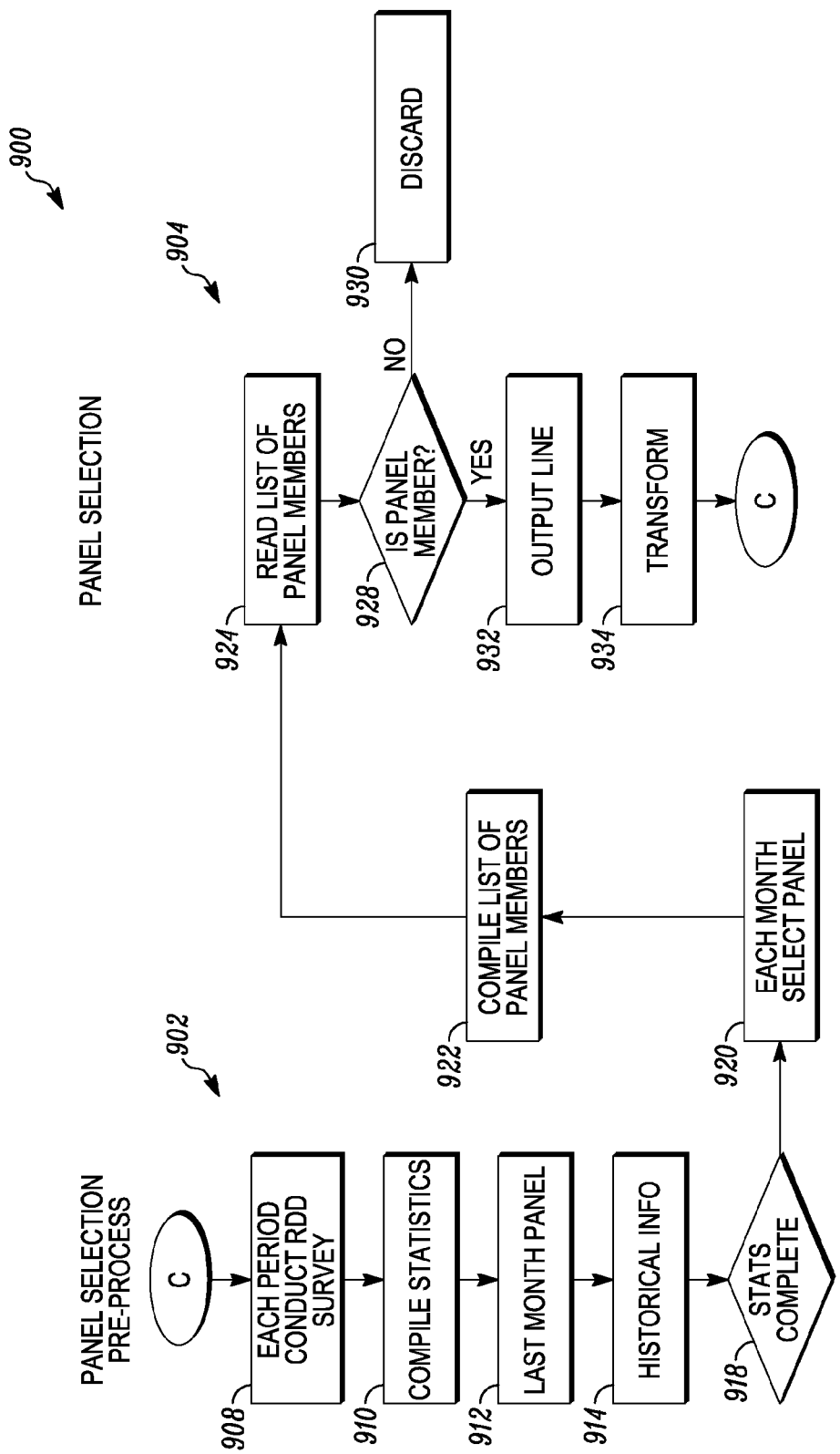
FIG. 9 is a flow diagram showing a panel selection pre-process and a panel selection process.

Referring to FIG. 9, a flow diagram 900 depicts a panel selection preprocess 902 and a panel selection process 904. In the panel selection pre-process, first, at a step 908 there is periodically (e.g., once per week or once per month) a survey conducted, such as a random digit dial (RDD) survey to determine the nature of certain characteristics of the Internet community. For example, the RDD survey determines the total number of Internet users in the United States, and it breaks down those users into categories based on age, income, gender and location (based on zip code or phone prefix). Next, in a statistical process 910, statisticians compile information from the RDD survey about age, income, activity level, where the user is online (home or work) and the like. Next, at a step 912 an operator of the host looks at the panel for the previous period and at a step 914 examines historical information about that panel of users. Next, upon completion of a statistical analysis of the previous panel and the current statistics from the RDD survey, the host selects a panel of users at a step 918. Selection is performed based on finding users with targeted combinations of various demographic information. The panel can consist of users with many different target combinations. In an embodiment, about one hundred combinations can be used with different demographic combinations. For example, one combination might be males aged 16 who are earning more than $30,000. Based on historical demographic data supplied to the host by the data providers, it is possible to generate a representative mix of users with the indicated characteristics for a wide variety of demographic combinations. At a step 922 the operator of the host can compile a list of panel members, completing the preprocess 902.

Selection of panel members is a statistical process that involves some degree of prediction. For example, selecting a panel involves guessing that a given user will be online again for the next month, so that data can be collected. If the host analyzes data less frequently (e.g., only after the end of a given month), then the host can analyze based on actual information about what users were actually on line in that month. However, if the host wishes to deliver information more rapidly (such as weekly or daily) then it can be preferable to predict what users will be online, rather than waiting to see what users were actually online before making a panel selection.

Next, at a step 924 the system reads the list of panel members generated at the step 922. For a given data file in the CLF format, at a step 928 the panel selection process reads the file line by line and determines whether the user identified by the user id 702 is a panel member. If not, then at a step 930 the system discards the file. If at the step 928 the user id 702 is for a panel member, then at a step 932 the system outputs the file and sends it at a step 934 to the transformation process depicted further in the flow diagram 1000 of FIG. 10.

Figures 10, 11:
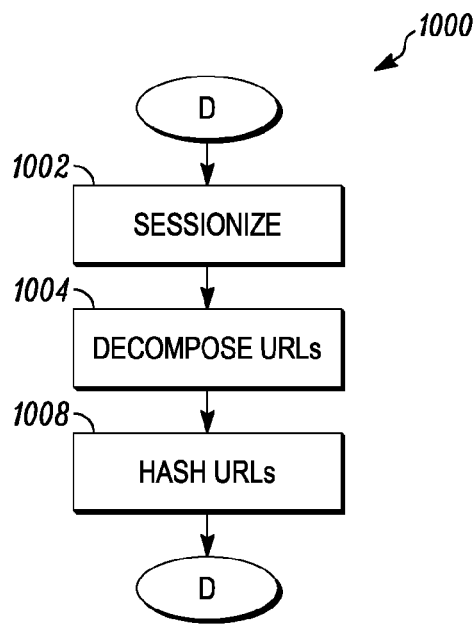
FIG. 10 is a flow diagram depicting steps for a transformation process of an embodiment of the present invention.
FIG. 11 depicts a breakdown of components of a typical URL.

Referring to FIG. 10, steps for a transformation process are provided in a flow diagram 1000. The transformation process 1000 reads a CLF format file line by line taking the output from the panel selection process 900 of FIG. 9. Thus, it takes output only for those files that are for panel members.

First, at a step 1002, the system sessionizes the data for a given user. Because a user may be logged on to a site all day (or longer), it can be difficult to identify clearly delineated online sessions for the user. In order to sessionize the data, the system looks at data for a particular user for a given day and walks down all of the URLs the user clicked on, looking for inactivity greater than a given time (e.g., 30 minutes) in the timestamps. If there is inactivity greater than the predetermined time, the end of a session is marked. Session identification can be accomplished with conventional log file analysis tools.

Once a session is identified at the step 1002, the system outputs a file in CLF format with a session id added. Thus, the file now has the user ID 702, data provider ID 704, time stamp 708, URL/URLs 710 and protocol 712, as well as the new element, the session ID 1010.

Once the data is divided into session at the step 1002, the system decomposes the URLs in the CLF format file in a step 1004. Decomposition of a URL is accomplished by applying a complex set of rules that are based on the location of given characters at given positions in the URL. Referring to FIG. 11, a URL 1100 is divided into a plurality of sections denoted in FIG. 11 by the dividers 1102. The URL of FIG. 11 is www.yahoo.com/search?p=football&5644. As the Internet grows, and as standard bodies introduce new top level domains, it is increasingly difficult to decompose URLs into readily identifiable components. In the URL 1100, certain conventional components can be identified. First, there is a subdomain 1104, which in this case consists of a part of a domain, such as the characters "www" indicating the presence of a particular domain as being on the Worldwide Web. Next, a URL may have a domain 1108, which typically consists of a prefix 1118 (often, but not always, the name or a contraction of the name of the entity hosting the URL) and a domain type 1120 (e.g., .com for commercial entities, .net for network companies, .gov for government entities, .org for non-profit entities, a domain type reflecting a country code, or various others). The URL may also include a path 1110, which typically reflects navigation within a structure of the entity that has the domain. The URL may have a query string 1112, which may include a structure for identifying data or content types along the indicated path. For example, the query string may include a parameter (p=) consisting of a value "football" and another parameter consisting of value S644.

The URL 1100 is just one of many configurations of URL, and the components 1102 should be understood to be representative of one way of decomposing a URL and labeling constituent elements. Many other ways can be used. In some decompositions, for example, the path 1110, or a combination of the path 1110 and the query string 1112, might just be identified as a query string. In any such embodiment, the decomposition process 1004 breaks down the URL into constituent parts, based on rules that may be adjusted to reflect the URL types of a given data provider or other entity that generates URLs. The decomposition process 1004 can be accomplished in embodiments by a rule engine that steps through the characters of the URL and identifies rules that apply to the given character in the given location, as well as rules that apply to given strings of characters in given components 1102 of the URL. The rule engine essentially figures out the grammar of the URL based on a codification of the rules for all URLs in a wide range of domains.

Maintaining a rule engine that properly decomposes URLs is difficult because of the emergence of facilities such as redirection services that take a given input and redirect the user to a different URL. Thus, the rules must recognize those redirections and classify the redirecting URL as the equivalent of the target URL to which the user is redirected. In addition, many sites (Yahoo.com, for example) are now serving as proxies for other sites, thereby "swallowing" content of the other sites. Thus, if a URL such as the following is visited by a user: http://yahoo.com/proxy/http://ebay.com, the system might initially be tricked into concluding that the domain is yahoo.com. However, the real content for such a URL is actually at another domain, ebay.com. Thus, the URL analysis rules must account for the use of proxies so that they can identify particular page content as being equivalent to other page content, regardless of the use of a proxy in one case and the absence of a proxy in the other. In some situations it may be desirable to identify and store the fact that a page was found through a proxy as well as what the page was. Thus, decomposition could identify and output a file that identifies use of proxies.

The process of decomposing URLs also consists of examining page level content for each of the paths and query strings and identifying rules for what paths and query strings mean in a wide range of contexts.

Figure 12:
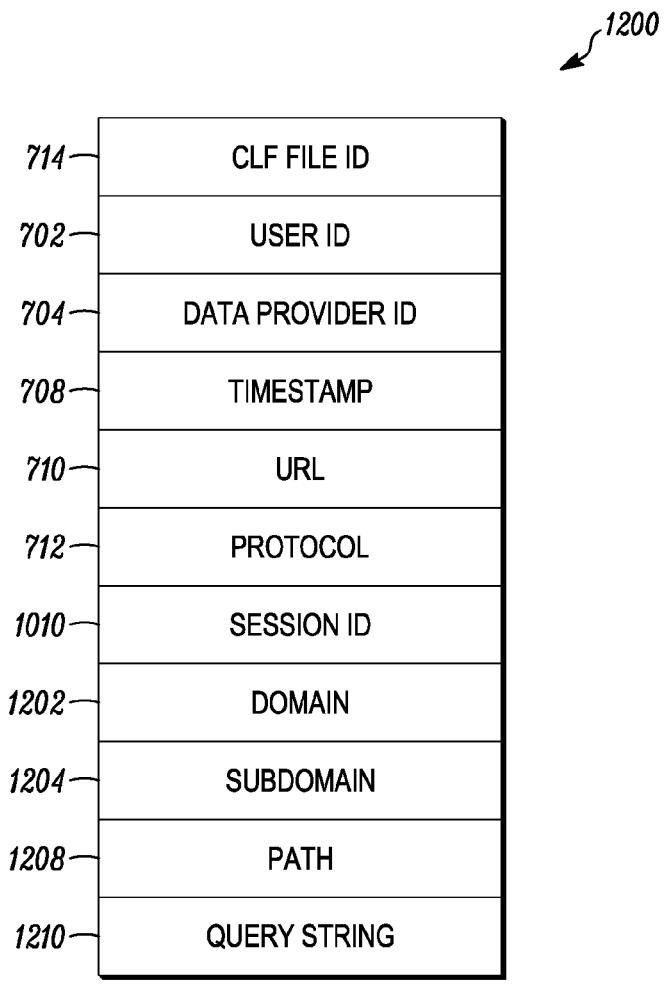
FIG. 12 depicts a file format for a file after adding information from a session identification process and a URL decomposition process.

Referring to FIG. 12, the output of the decomposition step 1004 in one embodiment is a file format 1200, including the basic CLF format with the user ID 702, data provider ID 704, time stamp 708, URL/URLs 710, protocol 712, as well as the session ID 1010, and now new elements from the decomposition step 1004, including, for example, the domain 1202, subdomain 1204, path 1208 and query string 1210.

Once a URL is decomposed at the step 1004 of FIG. 10, and the system has generated the output file in the format of FIG. 12, the system proceeds to a step 1008, at which it hashes the URLs that were decomposed at the step 1004. In an embodiment, the system takes the URLs and turns them into MD5 hashes, producing a unique hash identifier based on the character set. For each of these parts, the system generates a file that can perform as an index of URLs for later calculations.

Figure 13:
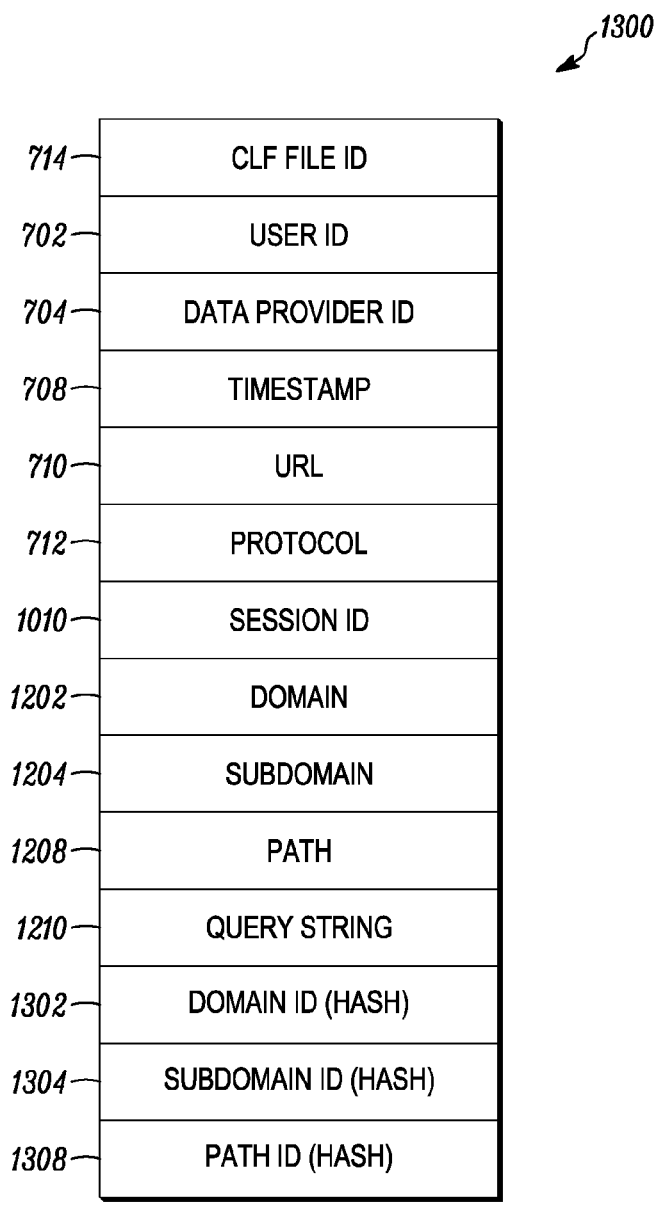
FIG. 13 depicts a CL5 file format that includes information of a common log format as well as hashes of certain data items.

The output of the hash step 1008 is a file in a format 1300 that can be called CL5, which is depicted in FIG. 13. The CL5 format consists of the elements of the decomposition step, namely, the user ID 702, data provider ID 704, time stamp 708, URL/URLs 710, protocol 712, as well as the session ID 1010, and now new elements from the decomposition step 1004, including, for example, the domain 1202, subdomain 1204, path 1208 and query string 1210, as well as new elements, including a domain ID hash 1302, a subdomain ID hash 1304 and a path ID hash 1308. Thus, the file format 1300 consists of the CLF format plus MD5 hashes (e.g., sixteen character hashes) for the last three items in the CLF format. This format is useful for future processing because, among other things, it is easier to index on a fixed number of characters.

Figure 5:
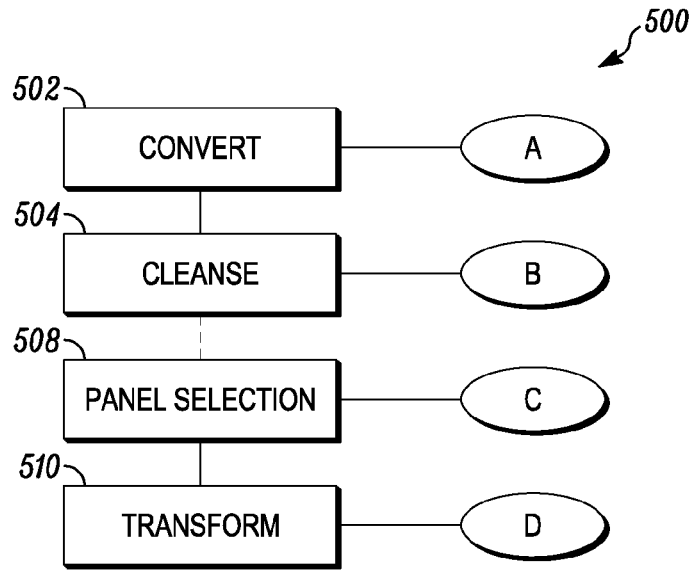
FIG. 5 is a flow diagram depicting certain high level steps of a pre-calculation process of the present invention.

Once the hash step 1008 is complete, the transformation process 510 of FIG. 5 is also complete. The net result is that the system has identified page level data and has decomposed it and indexed it based on what it means based on the content at the given URLs. Thus, the system has generated the capability of analyzing URLs based on semantic meaning.

In embodiments, the pre-calculation processes of FIG. 5, i.e., the cleanse process 504, the panel selection process 508 and the transformation process 510 operate line by line on incoming data. That is, each line goes to the cleanse process 504, then to the panel selection process 508, then to the transformation process 504, and so on.

Once a data file arrives in the system, the system checks file integrity at the step 430 of FIG. 4. Then it sends the files for the pre-calculation process of FIG. 5, applying rules across URLs and users, to produce files in a file format that can be called CLF, or compete log format in the form identified in FIG. 7, as well as files in the format of FIG. 12. At the end, the hash step 1008 of the transformation process 504 produces a file in a format that can be called CL5, or a "gold" log format, where some of the data is parsed out with one-way hashes to make lookups on those files easier. Taking URLs, breaking up into parts, and hashing parts of them allows the operator to create a pseudoindex to make it easy to look them up during the calculation process described below.

Once the pre-calculation process is complete the system can initiate a calculation process. The calculation process is designed to calculate various metrics that the operator of the host system wishes to generate out of the data provided by the data providers. Thus, the calculation process consists of many calculators, one or more for each metric that the operator wishes to calculate. The calculators can operate in parallel fashion running on clusters of machines to facilitate rapid calculation of the various metrics. Thus, in the calculation process the system ends up with multiple intermediate files running across multiple servers.

Once the calculation processes are complete, another process can be kicked off. That post-calculation process picks up the multiple files across multiple servers to merge, sort, and deduplicate files. Essentially, the post-calculation process merges data from the various servers that performed the calculation processes.

After post-calculation processes are complete, the resulting files can be sent out to various locations, such as a co-location server, where the files may be accessed by clients of the host system, and/or to an internal data warehouse, to allow analysts of the host to look at them. Depending on how the host decides to partition a day's data there might be multiple data warehouses where files will reside. Once there, users can request data from the warehouse, which they do through a facility such as a broker (a web-based interface that takes a request, decomposes it, identifies where in the data warehouse group of machines the data resides, and returns the data to the user through the broker). In embodiments the broker may give an intermediate result or may provide a final result that is the result of the sorting, merging and deduplicating processes. In embodiments the broker can allocate what files go on what machines and then return the files when requested by users.

More details of the calculation process are provided below. The calculation process may take place periodically, whether the period is daily, weekly, monthly or on some other time schedule. In embodiments, calculations are done daily to provide clients of the host with timely information. The calculation process can calculate many different metrics, such as the number of unique visitors to a page of content, search terms used by users, and classification of page content by industry verticals.

Figure 14:
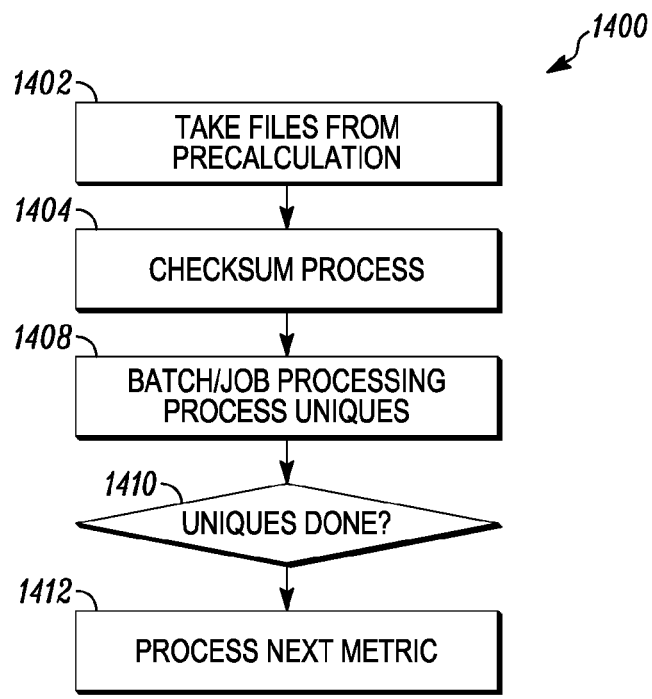
FIG. 14 is a flow diagram depicting steps for processing data for a particular metric in an embodiment of the invention.

FIG. 14 is a flow diagram 1400 showing steps for the processing of a particular metric in a calculation process. First at a step 1402, the system takes the files that come from the pre-calculation process 500 of FIG. 5, which are in a format such as the CL5 format 1300 of FIG. 13. In an embodiment, the step 1402 is accomplished by a daemon that is waiting to look for files to appear in a certain defined area. The daemon is programmed to look for the number of files that should be produced during that period (e.g., that day).

Next, at a step 1404, a checksum process happens for the daily (or other period) CL5 files to tell whether the pre-calculation process is finished writing the files out or not. When files are completed, they can be appended with a suffix, e.g., Filename.done. In the files are MD5 checksums of the files, so the system looks for the .done suffix and then compares the MD5 signature to the checksum to determine whether the files are ready to process. If the checksum works, then the system indicates so by a CHECKSUM OK message.

Next, at a step 1408, a job or batch handling facility manages a set of processing nodes to handle processing of the files. The job/batch handling facility is programmed to know which nodes are free (available for processing), which ones are busy, and which calculations can run on which nodes. (Some calculations can only run on certain nodes, while some can run on any node).

Once the handling facility hands of the processing to the nodes, the system checks periodically to determine whether the processing of a given metric is completed. For example, if the metric is the number of unique visitors to a URL, the system can at a step 1410 check to see whether the calculation of "uniques" is completed. If calculation for a metric is not complete, then processing continues. When the metric is complete at the step 1410, the system initiates processing for the next metric at a step 1412. Of course the system may calculate different metrics simultaneously, rather than completing one metric and then completing another. The flow diagram 1400 should be understood to set out the high level steps for only one embodiment of batch processing and identifying completion of a given metric calculation. Other embodiments would be readily understood by one of ordinary skill in the art.

In embodiments, each day the job processing facility knows how many work orders it has in the system. It looks up the work orders for that day. When it finds files ready to run, it begins to hand them to the nodes to run. The work orders can be conditional. Thus, they can run a given metric if the checksum is ok for the incoming file, and they can process a given metric conditioned on completion of another metric. For a work order, the job processing facility is programmed to know how many machines it needs, and it reserves the machines it needs. If processing a given metric, such as "uniques" requires four nodes, then the job processing facility can start running the calculation of uniques on four nodes, putting the other nodes on "wait" status. The job processing facility does this for each metric. The job processing facility can be programmed with a language of its own, similar to a compiler.

Figure 15:
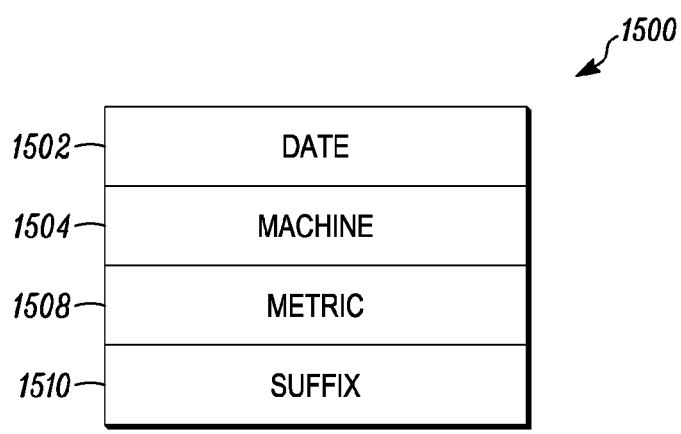
FIG. 15 is a diagram of a file format for output of a calculation process for a metric.

At a high level, the calculation process for a given metric checks to see if files are in the proper location, reserves machines needed for that metric, initiates processes on the appropriate machines, and outputs a file. Referring to FIG. 15, the file format 1500 for an output file from a machine contains various elements, including, in an embodiment, the date 1502, the machine 1504, the metric 1508 and a suffix or extension 1510.

Figure 16:
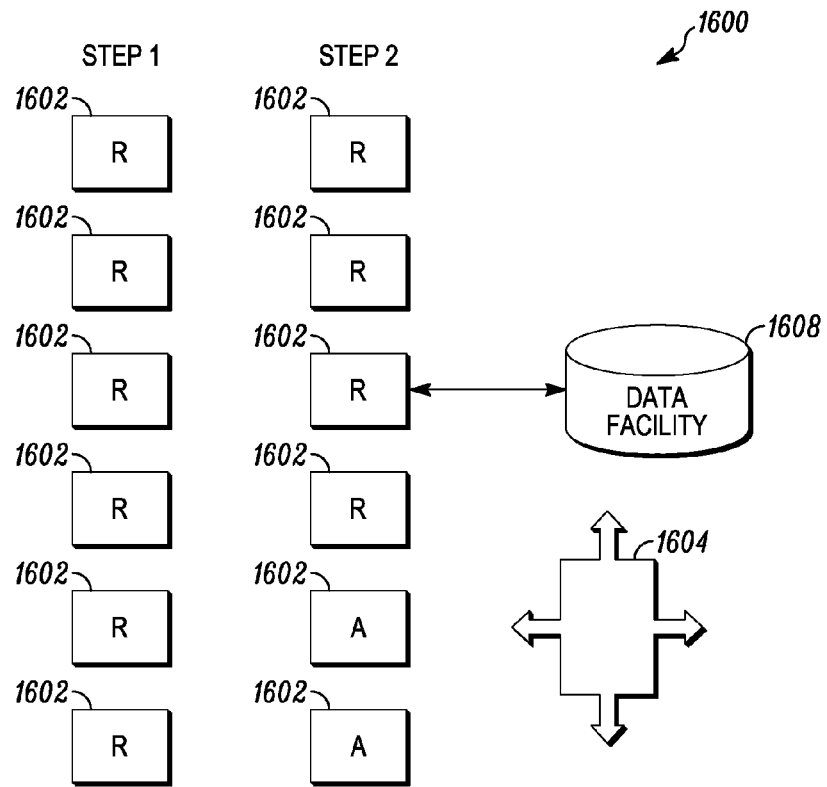
FIG. 16 is a schematic diagram depicting an array of machines for processing a metric in an embodiment of the invention.

Referring to FIG. 16, a schematic diagram 1600 shows a cluster of machines 1602 used for a calculation process. The machines can be assigned a status of "reserved", reflected by an "R" in FIG. 16 or "available", reflected by an A. Some machines 1602 may optionally be made capable of accessing an external communications facility 1604, such as the Internet, for retrieving data for use in their calculations. Other machines 1602 (or the same ones) may be made capable of accessing a data storage facility 1608, which may be an internal facility of the host system 200 or an external data storage facility. Thus, depending on the requirements of the calculation for the metric in question, the machines 1602 that run the calculation process can take advantage of external data, as well as using the files generated in the pre-calculation process.

Once the job/batch processing facility completes calculations for a given metric, a rollup process of the host system 200 can determine how many files were produced for that metric that day (or period), then combine them. For most metrics that can be accomplished by simply merging files. For some metrics, such as unique visitors, simply merging files may not be enough, because there may be a need to de-duplicate the files to avoid double counting a given user's visit to a URL.

Once the rollup process is complete the machine can produce a file (e.g., "date.unique") that contains the data for that metric for that date. In embodiments the file can be a GZIP file.

Figure 17:
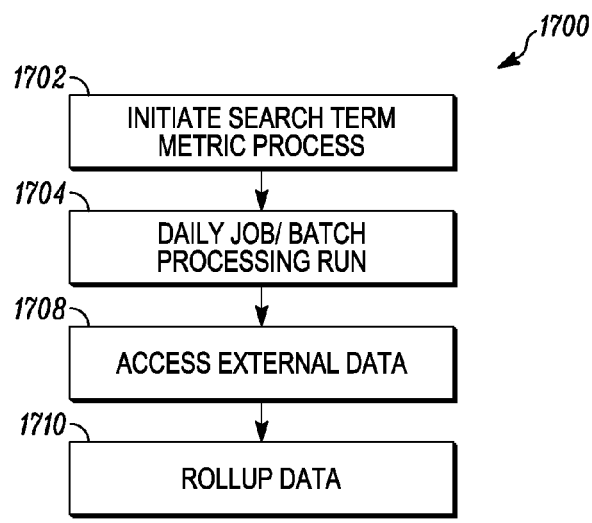
FIG. 17 is a flow diagram depicting steps for a calculation process.

Referring to FIG. 17, a flow diagram 1700 shows steps for calculating another metric, referred to herein as a "search terms" metric. In some respects the calculation of the search terms metric is similar to that for other metrics, such as the "uniques" metric discussed above. However, in other respects the search terms metric requires variation of the steps described above. First, at a step 1702, the system initiates the search term metric process (which may happen upon completion of calculations for another metric, such as uniques, thus freeing the machines that were being used to calculate uniques). At a step 1704 the calculation facility 210 of the host system initiates a daily job/batch processing run for the search terms metric. This is similar to the process described above for the calculation of the uniques metric, involving identification of the appropriate machines for the search terms metric, reserving the machines, and running the calculations on the files that came from the pre-calculation process. In the case of the search terms metric, not all data is found in the files that come from the pre-calculation process. Instead, at a step 1708 the search term calculation process accesses external data in order to complete the calculations for the search terms metric. Therefore, referring to FIG. 16, the machines 1602 used for the search terms metrics need to have the capability of accessing the external data facility 1608 in order to complete the calculations. The search terms metric calculator works not only on CL5 files from the pre-calculation process, but also on an external data set (from us or a third party). The calculator takes that information and uses it during the calculation.

In an embodiment, the external data is data from a dictionary of search terms from a multiplicity of web sites. In an embodiment, the host collects search terms from more than 27,000 sites for use by the search terms metric calculator. To know what the search pages and types are, the operator of the host system 200 or a third party goes to various sites and to sections within sites and figures out what the search URL looks like for that site. For example, for Yahoo.com the search URL might look like: search.yahoo.com? There are a wide variety of formulations for search strings. Some take the basic form of "domain.com/p=query string," but others take different forms. For example, some sites are co-branded by two different parties. For example, if google.com and the Washington Post co-brand a site, the URL may look as follows: "Wp.google.com (parameter)p=washingtonpost.com." The dictionary of search terms must recognize this as a Washington post search string, not a google.com one. Thus, the system sets up a rule that recognizes that if the string is of the form xx.google.com/xxx?q=xxx, the credit goes to the domain identified by the query string, not to google.com.

By way of example, Yahoo.com has hundreds of search pages on their site (finance ticker, groups, mail, etc.), so the host operator can establish or access a dictionary that takes the various forms and translates them to obtain the semantic meaning, or the host can use a rule or similar facility to accomplish a similar function.

So, when the job runs at the node level, the search terms calculator reads the external data, doing lookups on tables (held in node machines in memory) to figure out who should get credit for what URL. As with rules used in pre-calculation, it is too difficult to compare each URL with all possible search terms in the dictionary. Instead, the system can pass each line a single time, and the calculators figure out whether they should calculate something with the line or throw it out.

As with the other metrics, at a step 1710 the system rolls up the files into a single file ready for transfer to the data facility 120, the client 114 or the co-location facility 118.

Figure 18:
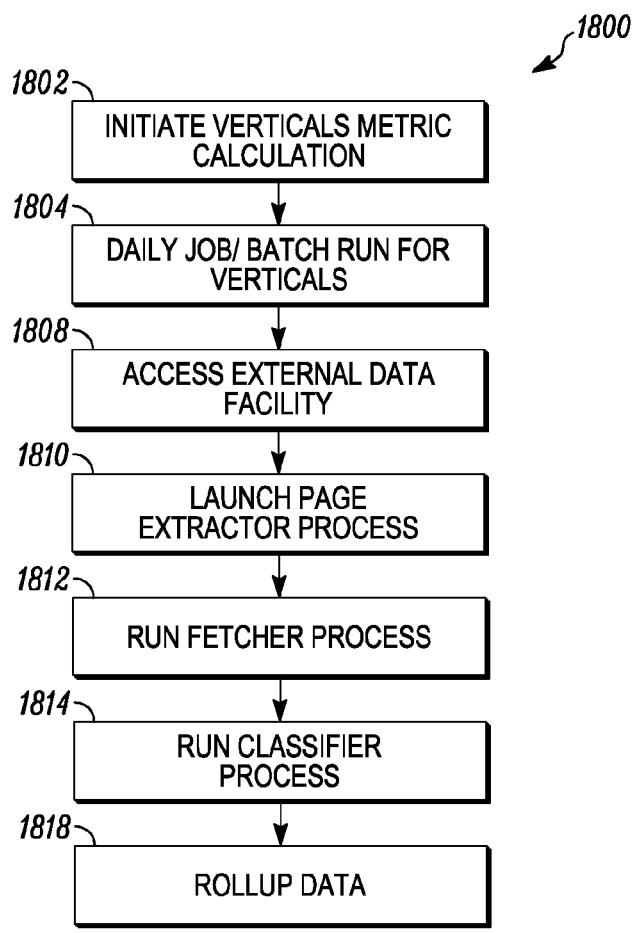
FIG. 18 is a flow diagram depicting steps for calculating a verticals metric in an embodiment of the invention.

Referring to FIG. 18, a flow diagram 1800 sets out steps for calculating another metric, called "verticals." This metric, like those described above, is done by a set of machines in the calculation facility 210 of the system 200. First, at a step 1802, the system initiates the "verticals" metric calculation. As with the other metrics, a checksum process ensures file integrity. Next, when machines become available, the calculation facility 200 reserves the appropriate machines for running the daily job/batch for the "verticals" metric calculation at a step 1804.

Next, at a step 1808, the system accesses an external communications facility. Thus, the machines used for the verticals calculation must be able to access an external communications facility, which will be used to reach an external data set. This time the system must go outside the internal network and do something in order to allow the processing.

The term "verticals" refers to industry classifications. For example, a "vertical" might be business-to-business services, with subcategories ranging from financial services, to office services, etc. Another set of verticals might be business-to-consumer services, with verticals including retail, financial services, etc. The system can classify any number of verticals.

Figure 19:
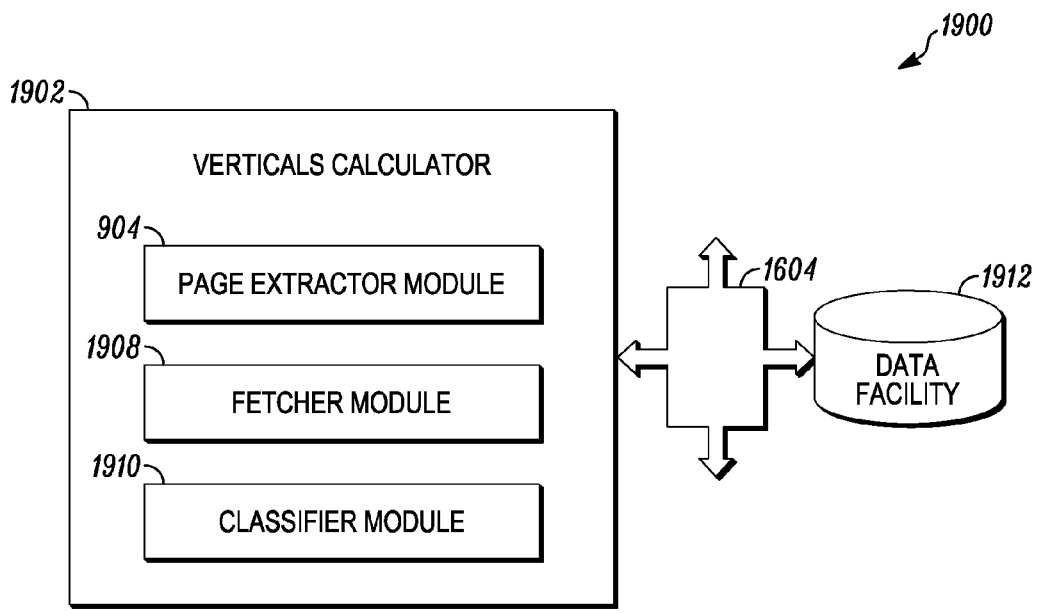
FIG. 19 is a schematic diagram showing a verticals calculator and the components for processing the verticals calculation.

Referring to FIG. 19, a schematic diagram 1900 shows a verticals calculator 1902 and three main constituent components that are used for the three main parts of the verticals calculation. The components are a page extractor module 1904, a fetcher module 1908 and a classifier module 1910. As can be seen in FIG. 19, the verticals calculation can use the external communication facility 1604 for accessing an external data facility 1912, such as to access a lexicon or set of rules stored on the facility 1912. Therefore, it is preferably run on a machine or machines that have that capability.

Referring to FIG. 18, once the external communications facility has been accessed at the step 1808, the system launches a page extractor process at a step 1810. The page extractor process reads a list of verticals stored by in the external data facility 1912, and for each vertical it launches a separate process to run for each of the sites that are classified in that vertical. For example, the B2B:Office vertical would run processes for sites for Office Depot, OfficeMax, Staples, and other office supplies vendors. The process is run for the high-level category (e.g., B2B), the sub-category (e.g., Office) and the sites within the sub-category. In embodiments, each site ends up getting a separate process launched on a separate node of the cluster of machines 214 of the calculator facility 210. The node knows where to look up a configuration file based on the hierarchy of verticals. The page extractor process 1810 reads in title and URL key value pairs. Then the process reads in reads in the CL5 files for that day, and it looks for data that matches these URLs/Title pairs to see if URLs from the CL5 files match these pages. This happens for all verticals. At the end of the batch, the system has a subset of a CL5 file with the date, a title (e.g., office depot) and a set of URLs that match the patterns for that site.

Once the page extractor process 1810 is complete, the fetcher module 1908 is engaged to run a fetcher process in a step 1812. The fetcher process reads a line in the file for a given site and determines whether it needs to update the data for that site. If so, then the fetcher process 1812 downloads the identified page. If the process has seen the identified page before, it can skip to the next one. If the fetcher process finds a new page, it downloads the page and puts it in the director of pages for that site. In embodiments the fetcher process only runs on certain nodes, because the host system must avoid flooding a site with downloads. The fetcher accesses an external network and in embodiments only runs on one or a few machines. The fetcher module can be programmed to now the maximum rate at which it should pull pages. In embodiments the fetcher module knows how to take codes for changed pages, moved pages, and indications that a site is not in operation. In each case it can produce alerts for the operator of the host system 200 to change something.

The next step in the verticals metrics calculation engages the classifier module 1910 is a classifying step 1814. Once the fetcher module 1908 has downloaded any new page identifiers, then for every URL in a given file (e.g., a file for Office Depot pages), the classifier module 1910 writes out a record to a fetcher database. In embodiments this can be a flat file hierarchy held locally and mirroring the live site, e.g.—officedepot.com/category/product/ID. Such a file can serve as an archive of the hierarchy of pages at the given site, including, for example, product directory files for all products offered at the site. The classifier module 1910 figures out for that day how many unique products it saw. In embodiments, it goes into flat file database and knows how to open the identified page and pull out the product information (title, description, price, shipping status, etc.). How to do that for a given site can be stored in the configuration file for the page extractor. It may be different for every site and page that the host system 200 tracks. Thus, the host system operator may have to come up with different patterns for the various pages and sites that it covers.

The classifying step 1814 takes the information and writes out another file. An example of a file structure would include elements such as the product name, the price, the quantity obtained for that price, the user ID, and the date. For example, it might appear as follows: Red stapler/$10.00/quantity 2/ID/date. The classifier module 1910 can do this for all of the different pages that are visited by users in the CL5 files for all of the CL5 files. In embodiments the classifier module 1910 can aggregate records across a category (e.g., B2B: Office). In such embodiments, a user of the data can compare products, such as all staplers, to see which ones users are viewing and buying. The classifying step 1814 can do this for office sites, retail, financial services, stock tickers, and other pages. In embodiments it can map a ticker back to the real name for the company.

Once a classifying step 1814 is complete, then at a step 1818 the system can rollup the files for the verticals calculation, as it does for the other metrics that are involved in job/batch processing.

The methods and systems described above cover three out of many possible metrics that can be calculated. Some metrics may be run with data just from the CL5 files that are generated in the pre-calculation processes disclosed above. Others require reference to an external data set as well as data from the CL5 files. Still others require access to page information, such as fetched from the Internet with the fetcher module 1908. Examples of metrics include, without limitation, unique visitors, search terms, verticals, cross-correlations between sites, uses of particular patterns of pages, and many others. Each different metric can have a unique calculator, typically running on a node of the cluster 214, using a program coded for that metric.

The various metrics can be used by analysts to deduce information that is relevant to many different kinds of business processes. For example, data about how users interact with pages that relate to applications for a quote on an insurance policy can produce insight into what is involved in converting an insurance shopper into an insurance buyer.

The data obtained can be quite comprehensive. In embodiments, it may consist of user interactions with many thousands of pages divided into hundreds or thousands of vertical categories.

Figure 20:
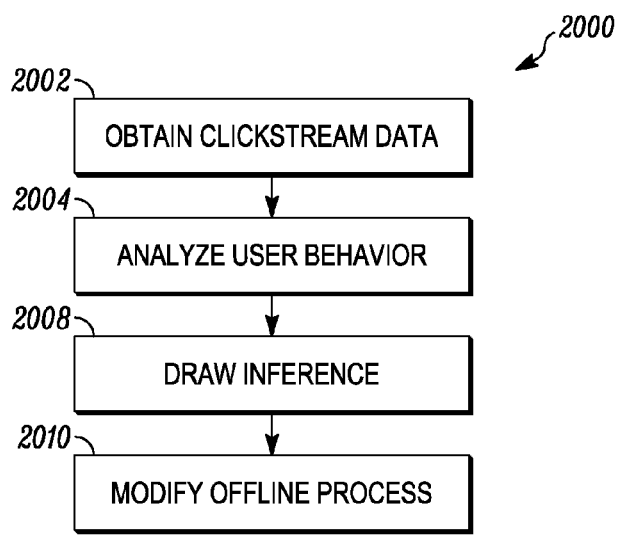
FIG. 20 is a flow diagram for a high-level business modification process of an embodiment of the invention.

Referring to FIG. 20, a flow diagram 2000 depicts high-level steps for a business process using data from the methods and systems disclosed herein. At a step 2002 the system obtains clickstream data about user behavior, such as through pre-calculation and calculation processes described above. Next, at a step 2004, an analyst analyzes user behavior based on the nature of the clickstream data. Next, at a step 2008, the analyst draws an inference about user behavior based on the nature of the clickstream data. Finally, at a step 2010, the analyst modifies a business process based on the inference. In embodiments, the analyst modifies an offline business process in response to inferences drawn from online user behavior.

The system 200 may further have a post-calculation facility 212 for merging, sorting and deduplicating the files that are generated in the calculation process. After the post-calculation facility 212 completes these tasks, the files can be deployed internally to data warehouses, or externally to external data facilities, such as a co-location facility 118 that can be accessed by a client.

Data that is collected and processed by the methods and systems disclosed herein can be used as a basis for modifying a wide range of business processes. One area is in the promotion of goods and services. It is well known that demographic information can be used as a basis for designing product promotion; that is, certain groups of customers are more likely to purchase certain goods and services than others. For example, parents are more likely than teenagers to purchase baby strollers. Other information about user behavior can be used to assist in designing product promotion as well.

One embodiment of the method and systems disclosed herein is an improved method of promoting automobiles. Automobiles are typically promoted with incentives, such as low-interest financing, rebates, and the like. Presenting the right promotion at the right time increases the likelihood of making a sale while minimizing the cost of promotions. Understanding what vehicles a particular car model is being cross-shopped against regionally enables the design of incentives to take account of the varying competitive set. For example, if a customer shops for a Toyota Camry, is that customer more likely to look at a Nissan Maxima, or a Nissan Altima, either of which could be viewed as similar. Knowing what cross-shopping is likely to occur allows a vendor to present incentives in a manner that accounts for the likely comparisons that the customer will make between the vendor's products and services and potentially competitive ones. The methods and systems disclosed herein allow an analyst to track cross-shopping behavior and allow a vendor to modify incentives in response to inferences drawn from cross-shopping behavior. By identifying regional variations and changes in the vehicles cross-shopped, an analyst can recommend incentives to fit the changed circumstances, thereby maximizing sales at the lowest incentive cost.

A second example would be brand positioning. One relevant factor in presenting a marketing message is the order in which the user has shopped various product offerings. For example, if an offering is the first one that a user has shopped, then it should be advertised in a fashion that encourages users to purchase immediately, rather than consider other offers. If the user has already seen more than one offer, then the subsequent offers need to be positioned differently. If a vendor is presenting an offer after many others have been considered, then the offer needs to be sufficiently arresting to get the attention of customer late in the process. So, for purposes of branding, messaging, and marketing communications, it is valuable for a vendor to know whether that vendor is typically the first vendor shopped, or whether the vendor typically comes later in the process. This is true whether the marketing message is presented online or offline.

By identifying patterns of online shopping for the products or services offered by a particular vendor, the methods and systems disclosed herein allow an analyst to determine the order in which a customer typically shops for products or services of that type. Then the vendor can select and present messages, promotions, and branding that is consistent with the position of the vendor in the typical shopping pattern. This approach can be used in any product or service sector, ranging from automotive, to retail, financial, and others.

Knowing customer patterns can also be useful for other business purposes, such as demand forecasting. For example, analysis of customer interest can determine if a predictable share of customers who have looked at a set of competitive products and services will purchase a particular vendor's product or service. Changes in the share of online users who research goods or services can be used to predict change in market share offline. Thus, by allowing tracking changes in online market share, the methods and systems disclosed herein can assist in offline business planning for changes that depend on changes in sales or market share, such as manufacturing and inventory needs.

Thus, data about online behavior can also help in forecasting demand. For example, in the auto market, knowing what people are researching (e.g., measuring frequency, recency and duration of online shopping for particular models), allows the business to forecast demand for particular make, model and trim in particular geographic regions. That forecast can be used allow a business to set inventory and manufacturing at optimal levels. Also online interest share changes (showing interest in a particular product) can be correlated to offline sales. Then the business can manage its supply chain and manufacturing to allocate the correct amounts of inventory to the right places at the right time.

Another area in which tracking online user behavior can allow strategic modification of offline business processes is in the area of retail store operation. Retail stores are designed to encourage users to see merchandise in a particular pattern. Stores are particularly designed to present complementary products near each other. For example, tortilla chips and salsa are usually presented in the same area of a supermarket. Also, the order in which a customer sees merchandise can make a difference in the likelihood the customer will buy a particular item. For example, studies have shown that people perceive the price of an item to be lower if they have previously been presented with a higher-priced item. For example, a forty-dollar tie seems less expensive if the customer has just selected a five hundred dollar suit. Moreover, the need for the tie may be more clear to the customer if the decision to purchase the suit has already occurred.

It is expensive and time consuming to rearrange a retail store to try to figure out which items should be presented together, and what order should be used to present items. In embodiments of the methods and systems disclosed herein, tracking user behavior online allows an analyst to draw an inference about what items should be presented together, and what items should be presented in what order, in a retail store. For example, if it is discovered that most online users who purchase personal computers also shop for printers, then an analyst might conclude that computers and printers should be presented together. In some cases the connection between the items might have been obvious, but in other situations a correlation between shopping for one item and shopping for another may not be readily apparent without the ability to track and recognize statistical correlations among items, a process that is made possible by tracking user behavior in the methods and systems disclosed herein. Thus, the methods and systems disclosed herein allow the user to organize merchandise in the physical world based on online behavior.

In addition to locating merchandise within a retail environment, it is also possible to draw inferences about how to locate an entire store based on analysis of user behavior online. For example, if goods and services of two different vendors are identified through statistical techniques as complementary, then one vendor may wish to select a location near the other vendor, even if the connection between the two is not intuitively obvious.

In other embodiments, data from online behavior can be used to draw inferences to develop offline business processes in the financial services area. For example, businesses need to determine what products and services should be offered through what distribution channel, whether it is an online channel, a call center, a branch, or an ATM channel. For example, financial advice and stock quotes might best be delivered through different channels. If online behavior shows that customers examine individual stock information online, but get confused with mutual funds, then a business can decide to put the individual stock information online, but to offer mutual funds through other channels, such as advisors in branch offices. Thus, figuring out the proper offline distribution channel can be done with the assistance of inferences drawn from online behavior.

Location decisions also benefit from online information. For example, if a business can learn where its competitor's online shoppers come from by zip code, a business can decide to locate its physical facilities in locations where the competitor's online shopper density is highest or lowest, as desired. This can help the business get new business from competitors, rather than cannibalizing its own customer base.

Other retail business processes can also be helped. By determining interest share by zip code, a catalog provider can, for example, drop the customized versions of a catalog by zip code to meet regional needs. Similarly, other direct marketing campaigns, such as mail campaigns, can be targeted to the right demographic and location based on online interest.

Pricing decisions also benefit from analysis of online behavior. For example, knowing how the number of transactions is affected when a price is changed can help a business determine an optimal price for goods or services. It can be also useful to know how many people shop elsewhere after a price increase, as compared to before. By looking at behavior across multiple sites it is possible to set prices at the highest point of price indifference. Thus prices can be tuned for online and offline offerings based on online behavior data.

It is also possible to watch behavior of a competitor's customers after the competitor increases prices. Also, a business can introduce price changes online to a limited set of customers to determine sensitivity before making more extensive price changes offline.

The methods and systems disclosed herein can assist media businesses as well. By determining the patterns and reasons for online migration between different online content sources, it is possible to draw inferences about the customer's behavior that allow the content to be designed to keep the user at a given content source. For example, if a readers of Forbes regularly depart its online site to look at particular portions of Fortune's online site, it is possible to redesign the content of the Forbes site to contain similar content, thus diminishing the chance the reader will depart. Thus, behavior online can be used to help redesign media content to retain customers. Media businesses can also use online behavior to identify geographic areas of interest and other demographic areas of interest for books, music, news, film and other content. In turn, offline channels of distribution for media content can be altered to target particular geographic or demographic groups. Also, media businesses can target attracting customers based on their online behavior profile with a view to maximizing the attraction of the "best" or most loyal customers.

It is also possible to forecast demand for media content. For example, web traffic at particular sites related to upcoming movie content may tell film distributors which films should be shown on which screens and for how long. Media providers can also determine what kind of related merchandise to sell along with the media, and what kinds of promotions to engage in. The data can be used to determine appropriate franchising arrangements as well, such as how much to charge for a franchise to distribute toys or other novelties that reflect characters in a film.

Similar forecasting can be used before release of a new musical composition, book, or other media work.

All patents, patent applications, technical specifications, books, and other documents identified herein are hereby incorporated by reference. While the invention has been described in connection with certain preferred embodiments, other embodiments would be readily understood by one of ordinary skill in the art and are encompassed herein.

What is claimed is:

1. A method, comprising:
    receiving a data file containing records of a plurality of HTTP (HyperText Transfer Protocol) transactions of a plurality of users, each of the HTTP transactions including at least one URL (Uniform Resource Locator);
    converting the data file into a common file format;
    cleansing the data file in the common file format by applying a plurality of URL rules to remove session identifiers while accounting for the use of proxies, thereby producing a cleansed data file containing at least one modified URL;
    performing a panel selection process, comprising:
        conducting a periodic survey of a subset of Internet users to determine characteristics of an Internet community that includes the subset of Internet users, the characteristics including demographic characteristics;
        selecting a panel of users from the subset of Internet users, the panel of users having a targeted combination of the demographic characteristics;
        retaining the data file only when it contains a user identifier of a user in the panel of users;
    for each user in the panel of users, using a computer, performing a transformation process, comprising:
        selecting a user,
        removing from the data file those URLs that do not contain the user identifier of the selected user;
        determining which URLs in the data file belong to a session of the selected user in the panel of users;
        assigning a session identifier to the session;
        creating a plurality of session data files, each of which contain the selected user identifier, a time stamp, the URLs in the data file that belong to the session, and the session identifier;
        decomposing, using software modules and a cluster of machines that run parallel calculations to decompose, the URLs in each of the plurality of session data files so that the URLs in each of the plurality of session data files are decomposed URLs; and
        hashing the decomposed URLs so that the decomposed URLs are hashed, decomposed URLs;
    calculating a metric of user behavior based upon the hashed, decomposed URLs;
    merging the metric of user behavior into a file containing a plurality of metrics of user behavior; and
    transmitting to a remote machine the file containing the plurality of metrics of user behavior, wherein the file containing the plurality of metrics of user behavior enables a third party to track and analyze competitive product pricing.

2. The method of claim 1, wherein the file containing the plurality of metrics of user behavior further enables the third party to test a price adjustment of a product or service.

3. The method of claim 2, wherein based on the results of the test, the highest point of price indifference is determined.

4. The method of claim 2, wherein the price adjustment is made with a limited set of consumers to determine a consumer sensitivity before making more extensive price changes offline.

5. The method of claim 1, wherein the file containing the plurality of metrics of user behavior further enables the third party to optimize pricing of a product or service.

6. The method of claim 1, wherein the product is a media content.

7. The method of claim 1, wherein at least one of the URL rules is generated by the computer.

8. The method of claim 1, wherein the parallel calculations include the calculating of the metric of user behavior based upon the hashed, decomposed URLs.

9. A host computer, comprising:
- a data collection facility that receives a data file containing records of a plurality of HTTP (HyperText Transfer Protocol) transactions of a plurality of users, each of the HTTP transactions including at least one URL (Uniform Resource Locator); checks for integrity of the data file and the records; and converts the data file into a common file format;
- a pre-calculation facility including one or more computers, the pre-calculation facility being configured to perform a cleansing process, a panel selection process, and a transformation process, wherein
  the cleansing process comprises:
    cleansing the data file in the common file format by applying a plurality of URL rules to remove session identifiers while accounting for the use of proxies, thereby producing a cleansed data file containing at least one modified URL;
  the panel selection process comprises:
    conducting a periodic survey of a subset of Internet users to determine characteristics of an Internet community that includes the subset of Internet users, the characteristics including demographic characteristics;
    selecting a panel of users from the subset of Internet users, the panel of users having a targeted combination of the demographic characteristics;
    retaining the data file only when it contains a user identifier of a user in the panel of users;
  the transformation process comprises, for each user in the panel of users:
    selecting a user;
    removing from the data file those URLs that do not contain the user identifier of the selected user;
    determining which URLs in the data file belong to a session of the selected user in the panel of users;
    assigning a session identifier to the session;
    creating a plurality of session data files, each of which contain the selected user identifier, a time stamp, the URLs in the data file that belong to the session, and the session identifier;
    decomposing, using software modules and a cluster of machines that run parallel calculations to decompose, the URLs in each of the plurality of session data files so that the URLs in each of the plurality of session data files are decomposed URLs; and
    hashing the decomposed URLs so that the decomposed URLs are hashed, decomposed URLs; and
- a calculation facility that calculates a metric of user behavior based upon the hashed, decomposed URLs, performs a post-calculation process, and transmits to a remote machine a file containing a plurality of metrics of user behavior, wherein the file containing the plurality of metrics of user behavior enables the third party to track and analyze competitive product pricing, and wherein the post-calculation process comprises:
  merging the metric of user behavior into a file containing a plurality of metrics of user behavior.

10. The host computer of claim 9, wherein the file containing a plurality of metrics of user behavior further enables the third party to test a price adjustment of a product or service.

11. The host computer of claim 10, wherein based on the results of the test, the highest point of price indifference is determined.

12. The host computer of claim 10, wherein the price adjustment is made with a limited set of consumers to determine a consumer sensitivity before making more extensive price changes offline.

13. The host computer of claim 9, wherein the file containing a plurality of metrics of user behavior further enables the third party to optimize pricing of a product or service.

14. The host computer of claim 9, wherein the product is a media content.

15. The host computer of claim 9, wherein at least one of the URL rules is generated by the host computer system.

16. The host computer of claim 9, wherein the parallel calculations include the calculating of the metric of user behavior based upon the hashed, decomposed URLs.

* * * * *